Patented Mar. 2, 1948

2,436,841

UNITED STATES PATENT OFFICE 2,436,841

TESTING METHOD FOR POLYSTYRENE

Arthur J. Warner, South Orange, N. J., assignor to Federal Telephone and Radio Corporation, New York, N. Y., a corporation of Delaware No Drawing. Application March 12, 1945, Serial No. 582,405

2 Claims. (Cl. 260—91)

This invention relates to novel methods of treating polystyrene and is more particularly directed to novel methods for purifying polystyrene or for determining the quantity of methanol soluble substances associated therewith.

One of the starting materials that may be employed in the preparation of monomeric styrene is ethylbenzene. After the monomeric styrene is produced, it may be polymerized to provide solid polymers thereof. Ordinarily the monomeric styrene is heated to polymerize the same to the solid state and until the molecular weight of the polymers produced is relatively high and is at least about 60,000 and preferably between about 60,000 and 120,000. Then this solid polystyrene may be comminuted to provide a powder which finds commercial application as a molding material. It has been known that these solid polymers of styrene contain traces of ethylbenzene, the starting material, and also of monomeric styrene and even of some low molecular weight polystyrene whose molecular weights may be no greater than about 10,000.

The presence of monomeric styrene and/or ethylbenzene in said molding powders is detrimental to the satisfactory molding of parts because ageing phenomena occur due either to the continuous and progressive polymerization of said monomer or to the evaporation of said monomer and/or ethylbenzene or to the oxidation of either or both of these materials. The presence of said low molecular weight polystyrene is also disadvantageous because of the tendency of this material to become brittle at low temperatures and also because of its low softening point causing an undesirable decrease in the heat-distortion point of the material at high temperature.

Heretofore, it has been proposed to treat polystyrene with a solvent, which is either toluene, methyl-ethyl-ketone or benzene to dissolve the polystyrene. Then to this solution is added an excess of methanol whereupon the polystyrene is precipitated out. This entire mass must then be heated on a water bath in order to coagulate the precipitate. Following this coagulation step, the coagulated precipitate may be separated from the liquid carrying the same. This method has not been satisfactory because (1) comparatively large quantities of solvent are required, (2) comparatively large apparatus is required, (3) since the boiling points of the solvents employed are considerably higher than the boiling point of methanol, any evaporation which takes place during the process is at the expense of the precipitant (methanol) thereby presenting the danger of the high molecular weight polystyrene being redissolved in the solvent after precipitation thereof, (4) the step of coagulation is a time consuming task.

Because the foregoing method has had the aforesaid disadvantages, and because other methods have had other and in most cases even greater disadvantages, there has existed for a long time the need for a simple, convenient, rapid and economically practical method for purifying or determining the amount of said high molecular weight polystyrene in molding materials. Therefore, it was with a view towards providing such methods that this invention has been made.

According to this invention, a quantity of solid polystyrene consisting essentially of high molecular weight polystyrene having a molecular weight of at least about 60,000 and preferably between 60,000 and 120,000 is dissolved in propylene oxide

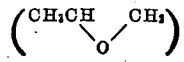

The quantity of propylene oxide used is that necessary to completely dissolve the entire mass of said polystyrene, and sufficient to give a solution of medium viscosity, (for example approximately 50–500 centipoises). After solution takes place, there is added to said solution a quantity of methanol whereupon the high molecular weight polystyrene is precipitated out of said solution and the methanol soluble constituents, ethylbenzene, monomeric styrene and polymeric styrene whose molecular weights are below about 10,000 are dissolved in and retained in solution with said alcohol-propylene oxide mixture. Upon the addition of the methanol, the high molecular weight polystyrene precipitates out of the propylene oxide in the form of a very flocculent precipitate which rapidly settles to the bottom, leaving a clear supernatant liquid which enables filtering to take place within a very short time after precipitation, thus eliminating any necessity for coagulation on a water bath. The mass may be filtered and the precipitate may be dried to constant weight by any suitable means but preferably in a vacuum oven at 70° C. and the filtrate may be distilled to separate and recover the propylene oxide and the methanol. With the exception of the drying and the separation and recovery of the propylene oxide and methanol, the entire process may be carried out at room temperature.

Some of the advantages of the novel methods embodying this invention are: (1) much smaller quantities of solvent are required and the method can be conducted in smaller apparatus; (2)

because the solvent, propylene oxide, has a lower boiling point than the precipitant (methanol), any evaporation which takes place after the addition of the methanol is at the expense of the propylene oxide and not the methanol, thereby insuring that after precipitation, the high molecular weight polystyrene is not redissolved by the solvent present; (3) since the high molecular weight polystyrene is precipitated in the form of a very flocculent precipitate which rapidly settles and leaves a clear supernatant liquid, the separation of the precipitate from said liquid is rapid and easy and requires no coagulation on a water bath; (4) the methanol and propylene oxide can be easily and readily recovered and separated from each other.

The following is an example set forth by way of illustration and not in a limiting sense of my novel, simple, rapid, convenient and economically practical method for purifying polystyrene or determining the quantity of methanol soluble substances associated therewith.

In a glass vessel a quantity of solid polystyrene whose molecular weight is between about 60,000 and 120,000 is dissolved in a quantity of propylene oxide, with the ratio of the quantity of said polystyrene to the propylene oxide being 2 to 3 grams of the former to about 250 cubic centimeters of the latter. Then to said solution is added a quantity of methanol, whose volume is in excess of that of the propylene oxide and approximately six times the volume of propylene oxide in said solution. The entire mass is agitated and then allowed to stand whereupon the very flocculent precipitate of high molecular weight polystyrene quickly settles to the bottom of the container, leaving a clear supernatant liquid. The precipitate may be filtered out on a sintered glass crucible and then dried in a vacuum oven at about 70° C. to constant weight.

What is claimed is:

1. The method comprising dissolving a solid polymer of styrene in propylene oxide and to said solution adding a quantity of methanol to precipitate the polystyrene therefrom, the molecular weight of said polystyrene being about 60,000 to 120,000.

2. The method comprising dissolving polystyrene of a molecular weight of about 60,000 to 120,000 in propylene oxide, adding a quantity of methanol to said solution to precipitate the polystyrene therefrom, and separating the precipitated polystyrene from the liquid.

ARTHUR J. WARNER.

REFERENCES CITED

The following references are of record in the file of this patent:

Bartlett, Jour. Amer. Chem. Soc., vol. 65, pp. 543–546 (1943).

Price, Jour. Amer. Chem. Soc., vol. 65, pp. 757–759 (1943).

Alfrey, Jour. Amer. Chem. Soc., vol. 65, pp. 2319–2323 (1943).

Simonds, Handbook of Plastics, pages 248–249 (1943), D. Van Nostrand Co. Inc., New York.

Gregory, Uses and Applications of Chemicals and Related Materials, vol. II, page 277 (1944), Reinhold Pub. Corp., New York.